(12) United States Patent
Komine et al.

(10) Patent No.: US 7,718,060 B2
(45) Date of Patent: May 18, 2010

(54) FILTER DEVICE

(75) Inventors: Akiyoshi Komine, Yokohama (JP); Mitsunobu Okamoto, Yokohama (JP)

(73) Assignee: Yamashin-Filter Corp., Kanagawa (JP)

( * ) Notice: Subject to any disclaimer, the term of this patent is extended or adjusted under 35 U.S.C. 154(b) by 98 days.

(21) Appl. No.: 11/935,811

(22) Filed: Nov. 6, 2007

(65) Prior Publication Data

US 2009/0065420 A1 Mar. 12, 2009

Related U.S. Application Data (63) Continuation of application No. PCT/JP2006/320508, filed on Oct. 13, 2006.

(60) Provisional application No. 60/733,991, filed on Nov. 3, 2005.

(30) Foreign Application Priority Data

Oct. 13, 2005 (JP) .............................. 2005-299420

(51) Int. Cl.
*B01D 27/08* (2006.01)
*B01D 35/30* (2006.01)
*B01D 35/34* (2006.01)

(52) U.S. Cl. .................. 210/232; 210/767; 210/238; 210/444

(58) Field of Classification Search .......... 210/232, 210/238, 444, 767
See application file for complete search history.

(56) References Cited

U.S. PATENT DOCUMENTS

| | | | |
|---|---|---|---|
| 1,642,864 A | 9/1927 | Williams | |
| 2,028,062 A | 1/1936 | Goldman | |
| 2,360,020 A | 10/1944 | Skinner et al. | |
| 2,382,278 A | 8/1945 | Widmann | |

(Continued)

FOREIGN PATENT DOCUMENTS

JP 2003-509201 A 3/2003

(Continued)

OTHER PUBLICATIONS

European Search Report from European Application No. 06811781.1, dated Oct. 7, 2009, 5 pages.

*Primary Examiner*—Thomas M Lithgow
(74) *Attorney, Agent, or Firm*—Brinks Hofer Gilson & Lione (57) ABSTRACT

Filter device (10) is provided with a head (20), a filter element (40), and a housing (30). The head (20) is provided with an inlet (24) which is attached to a hydraulic circuit (5), and into which flows the operating oil (L1) that is to be filtered. The filter element (40) filters the operating oil (L1) that is to be filtered. The housing (30) has an opening (30b) through which the filter element (40) passes, and which holds the filter element (40) inside it. The filter element (40) is provided with an element main body (48), and an element pressing part (47). The element pressing part (47) is provided to the element main body (48). The element pressing part (47) is provided with a contact part (53) that can be shifted toward or away from the inner surface (30a) of the housing (30). A groove (35) that holds the contact part (53) is provided to the housing (30). The contact part (53) can be shifted until it comes out of the groove (35).

6 Claims, 10 Drawing Sheets

U.S. PATENT DOCUMENTS

| | | | |
|---|---|---|---|
| 2,439,936 | A | 4/1948 | Kasten |
| 2,804,211 | A | 8/1957 | Kennedy |
| 2,833,415 | A | 5/1958 | Wilkinson |
| 2,955,712 | A * | 10/1960 | Gutkowski .................. 210/234 |
| 3,225,929 | A | 12/1965 | Sicard |
| 3,332,554 | A | 7/1967 | Humbert Jr. |
| 3,390,778 | A | 7/1968 | Uhen |
| 3,502,218 | A | 3/1970 | Tuffnell et al. |
| 3,912,633 | A | 10/1975 | Delaney |
| 3,923,663 | A | 12/1975 | Reid |
| 4,465,595 | A | 8/1984 | Cooper |
| 5,084,162 | A | 1/1992 | Conti |
| 5,171,430 | A | 12/1992 | Beach et al. |
| 5,468,386 | A | 11/1995 | Ardes |
| 5,520,800 | A | 5/1996 | Glebovsky et al. |
| 5,681,461 | A | 10/1997 | Gullett et al. |
| 5,695,636 | A | 12/1997 | Gullett |
| 5,698,098 | A | 12/1997 | Ernst et al. |
| 5,762,788 | A | 6/1998 | Gullett |
| 5,814,215 | A | 9/1998 | Bruss et al. |
| 5,984,109 | A | 11/1999 | Kanwar et al. |
| 6,006,924 | A | 12/1999 | Sandford |
| 6,024,229 | A | 2/2000 | Ayers |
| 6,139,738 | A | 10/2000 | Maxwell |
| 6,159,366 | A | 12/2000 | Carroll |
| 6,258,269 | B1 | 7/2001 | Knight |
| 6,485,637 | B2 | 11/2002 | Jainek et al. |
| 6,488,845 | B1 | 12/2002 | Neufeld et al. |
| 6,500,335 | B2 | 12/2002 | Janik et al. |
| 6,533,933 | B1 * | 3/2003 | Stankowski et al. ......... 210/232 |
| 6,540,909 | B2 | 4/2003 | Smith et al. |
| 6,540,914 | B1 | 4/2003 | Smith |
| 6,569,326 | B1 | 5/2003 | Baumann et al. |
| 6,572,768 | B1 | 6/2003 | Cline et al. |
| 6,610,203 | B1 | 8/2003 | Jainek |
| 6,634,509 | B2 | 10/2003 | Ochi |
| 6,706,181 | B1 | 3/2004 | Baumann et al. |
| 6,709,588 | B2 | 3/2004 | Pavlin et al. |
| 6,758,980 | B2 | 7/2004 | Prater et al. |
| 6,790,356 | B2 | 9/2004 | Wright et al. |
| 6,863,184 | B2 | 3/2005 | Ochi et al. |
| 6,896,803 | B2 | 5/2005 | Cline et al. |
| 6,936,169 | B2 | 8/2005 | Baumann et al. |
| 6,960,296 | B2 | 11/2005 | Morita |
| 2003/0038073 | A1 | 2/2003 | Fall et al. |
| 2003/0141235 | A1 | 7/2003 | Stankowski et al. |
| 2004/0144734 | A1 | 7/2004 | Suzumori et al. |
| 2005/0077253 | A1 | 4/2005 | Sugiura et al. |
| 2005/0178713 | A1 | 8/2005 | Stockbower |
| 2005/0178714 | A1 | 8/2005 | Stockbower |

FOREIGN PATENT DOCUMENTS

| | | |
|---|---|---|
| JP | 2005-521547 A | 7/2005 |
| WO | WO 03/082435 A1 | 10/2003 |
| WO | WO 2004/033067 A2 | 4/2004 |

* cited by examiner

FILTER DEVICE

This application is a continuation of PCT Application No. PCT/JP2006/320508 filed Oct. 13, 2006, which claims priority to Japanese Patent Application No. 2005-299420 filed Oct. 13, 2005 and U.S. Provisional Application No. 60/733,991 filed Nov. 3, 2005, the entire contents of which are incorporated herein by reference.

FIELD OF TECHNOLOGY

The present invention relates to a filter device used for filtering fluid that circulates in a hydraulic circuit of hydraulic equipment having, for example, a hydraulic actuator.

BACKGROUND TECHNOLOGY

Equipment having an actuator, such as a hydraulic cylinder, is equipped with a filter device for filtering fluid such as operating oil that circulates in a hydraulic circuit. The filter device is provided with a filter element that filters fluid that is to be filtered within the system.

When a filter device is used beyond a certain period of time, the performance of the filter element degrades due to clogging and the like, and is therefore replaced.

This type of filter device is provided with a head that is coupled to a hydraulic circuit and that has an inlet for the inflow of fluid that is to be filtered and an outlet for returning the filtered fluid to the hydraulic circuit, a filter element, and a housing that contains the filter element, the housing also being coupled to the head. The filter element can be replaced by removing the housing.

However, the place where the filter device is coupled to the equipment is not necessarily in a location that is suited for the operation of coupling the filter device.

In other words, depending on the place where the filter device is coupled, if one tries to couple these units to the head after placing the filter element into the housing, it is conceivable that this unit may have to be tilted. In such a case, it is conceivable that the filter element could come out of the housing.

For this reason, when coupling the filter device to the hydraulic circuit, the filter element is coupled and immobilized on the head in advance, after which the housing is coupled to the head.

However, the housing is typically a cylinder that is closed at one end, with the other end having an opening through which the filter element is introduced to contain it, and said opening is covered by the head.

Accordingly, when the housing is coupled to the head after a filter element is coupled to the head, as described above, the housing becomes coupled to the head while containing the filter element.

In other words, the operating space for coupling the housing must be sufficient to accommodate the combined height of the filter element and the height of the housing. It is difficult to ensure such space.

For that reason, a filter device has been proposed with an element pressing member provided separately from the filter element, to prevent the filter element from coming out of the housing. In this type of filter device, the filter element is immobilized within the housing by installing an element pressing member after inserting the filter element into the housing. The filter element is thus prevented from coming out of the housing.

This type of filter device makes it possible to reduce the operating space required while coupling the housing to the head.

BRIEF SUMMARY

However, in cases where the structure has an element pressing member as described above, when the filter element is immobilized within the housing, there are the steps of enclosing the filter element within the housing, and then installing the element pressing member.

That is to say, since the element pressing member must be enclosed within the housing separately from the operation of enclosing the filter element within the housing, the efficiency of the operation of immobilizing the filter element within the housing is reduced. This is also the case in the operation of removing the filter element from inside the housing. Consequently, the efficiency of the operation of replacing the filter element becomes poor.

Therefore, the object of the present invention is to provide a filter device that allows for replacing the filter element in a highly efficient manner.

The filter device of the present invention is provided with a head, a filter element, and a housing. The head is provided with a flow channel in which flows the fluid that is to be filtered connected by an inlet for the inflow of the fluid that is to be filtered. The filter element filters the fluid that is to be filtered. The housing has an opening through which the filter element passes, and contains the filter element inside it, and communicates with the inlet and is attached to the head so as to cover said opening. The filter element is provided with an element main body and an element pressing member. The element main body is provided with a filter material. The element pressing member is disposed in the element main body. The element pressing member is provided with a contact part whose position can shift to a direction toward or away from the inner surface of the housing. The housing is provided with a stopping part that stops the filter element from coming out of the housing by contacting with the contact part. The position of the contact part is movable to a position where it is released from the stopping part.

A filter device constructed in such a manner does not need a separate pressing member to immobilize the filter element within the housing, due to the fact that an element pressing member is provided integrally with the filter element.

Accordingly, the element pressing member is inserted into the housing at the same time as the operation of inserting the filter element into the housing is carried out. In other words, since the filter element and the element pressing part are not inserted into the housing separately, the efficiency of the operation of immobilizing the filter element in the housing is enhanced. Likewise, the element pressing part is no longer removed separately, even in cases where the filter element is removed from within the housing.

In a preferred embodiment of the present invention, the element pressing member has a spring part. The contact part is impelled by the elasticity of the spring part to face toward the inner surface of the housing.

In accordance with this construction, the position of the contact part can shift due to the elasticity of the spring part. Thus, it is sufficient to simply press the contact part when changing the position of the contact part, so there is no need for a complicated operation to change the position of the contact part.

In a preferred embodiment of the present invention, a plurality of contact parts are disposed facing each other with the spring part disposed between them. A holding part is formed on the contact parts.

In accordance with this construction, when a holding part is grabbed by fingers to hold the filter element, each of the contact parts is naturally pressed in the flexing direction of the spring. As a result, the spring part will flex naturally. In other words, the operation of supporting the filter element and the operation of flexing the spring are performed together.

In a preferred embodiment of the present invention, the stopping part is a groove that holds at least a portion of the contact part and has a surface capable of making contact with at least a portion of the contact parts in the direction that the filter element comes out of the housing.

In accordance with this construction, movement of the filter element in a direction coming out of the housing is prevented by mutual contact between the contact part and the surface of the groove.

In a preferred embodiment of the present invention, the stopping part is an inner surface of the housing. The filter element is prevented from coming out of the housing due to the friction that develops between the contact part and the stopping part.

In a preferred embodiment of the present invention, the element pressing member can be attached to and removed from the element main body.

In accordance with this construction, the element pressing member is reused by removing the element pressing member from the element main body.

In a preferred embodiment of the present invention, the filter element is made from a resin.

In accordance with this construction, after-treatment of the filter element is relatively easy after it is replaced. [Not Applicable]

DETAILED DESCRIPTION OF THE PREFERRED EMBODIMENTS

A filter device 10 according to the first embodiment of the present invention is described using FIG. 1 to FIG. 8.

Figure 1:
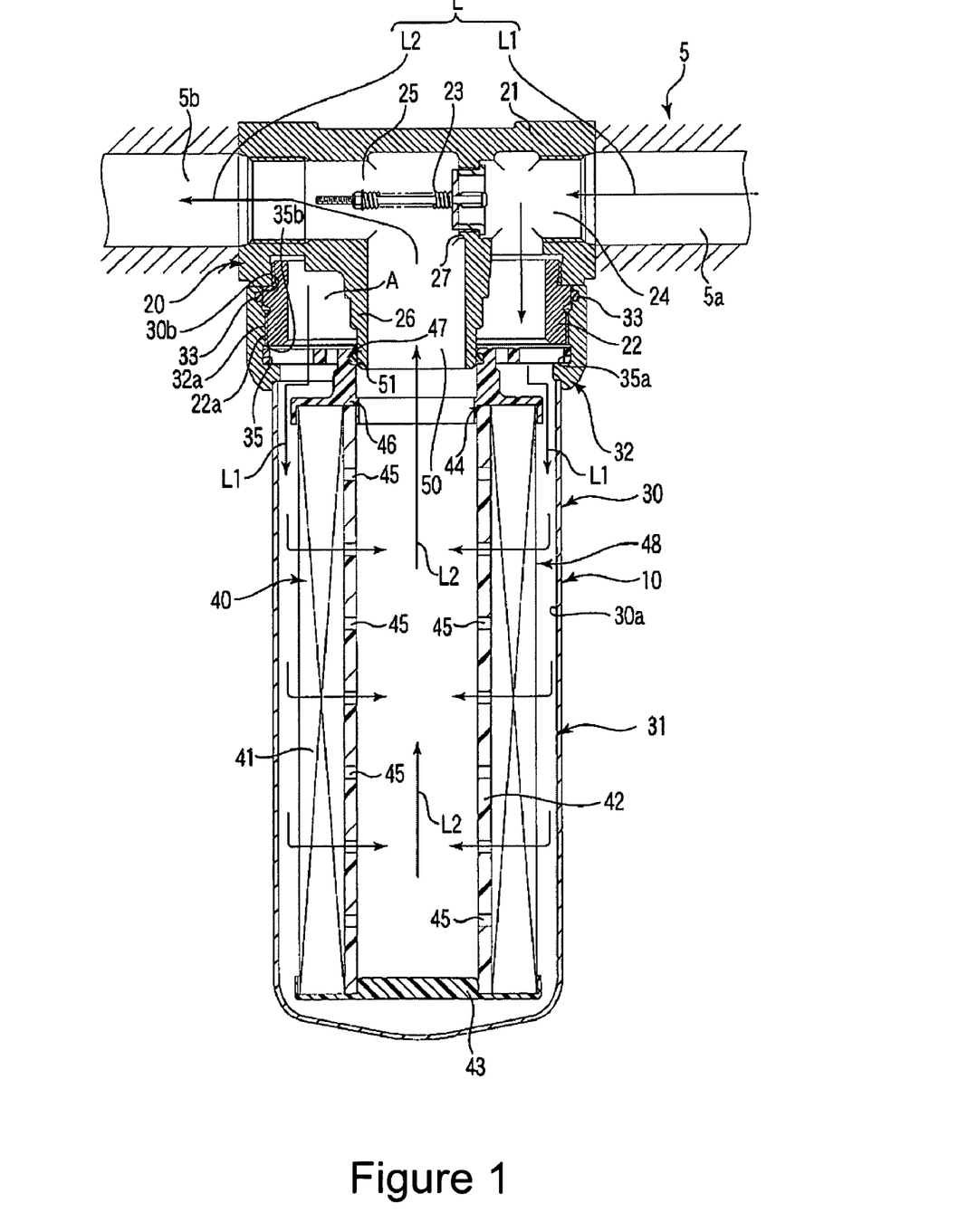
FIG. 1 is a sectional view of a filter device according to the first embodiment of the present invention.

FIG. 1 is a sectional view of the filter device 10 of the present embodiment. As shown in FIG. 1, the filter device 10 of the present embodiment is incorporated into a hydraulic circuit 5 of, for example, heavy machinery and the like equipped, with a hydraulic actuator. Operating oil L flows in the hydraulic circuit 5.

The operating oil L flows into the filter device 10 from the right-hand side of the drawing. In the operating oil L, the oil just prior to flowing into the filter device 10 is referred to as operating oil L1 that is to be filtered. The operating oil L1 is an example of fluid that is to be filtered. Operating oil L2 that has been filtered by the filter device 10 is returned to the hydraulic circuit 5.

Figure 2:
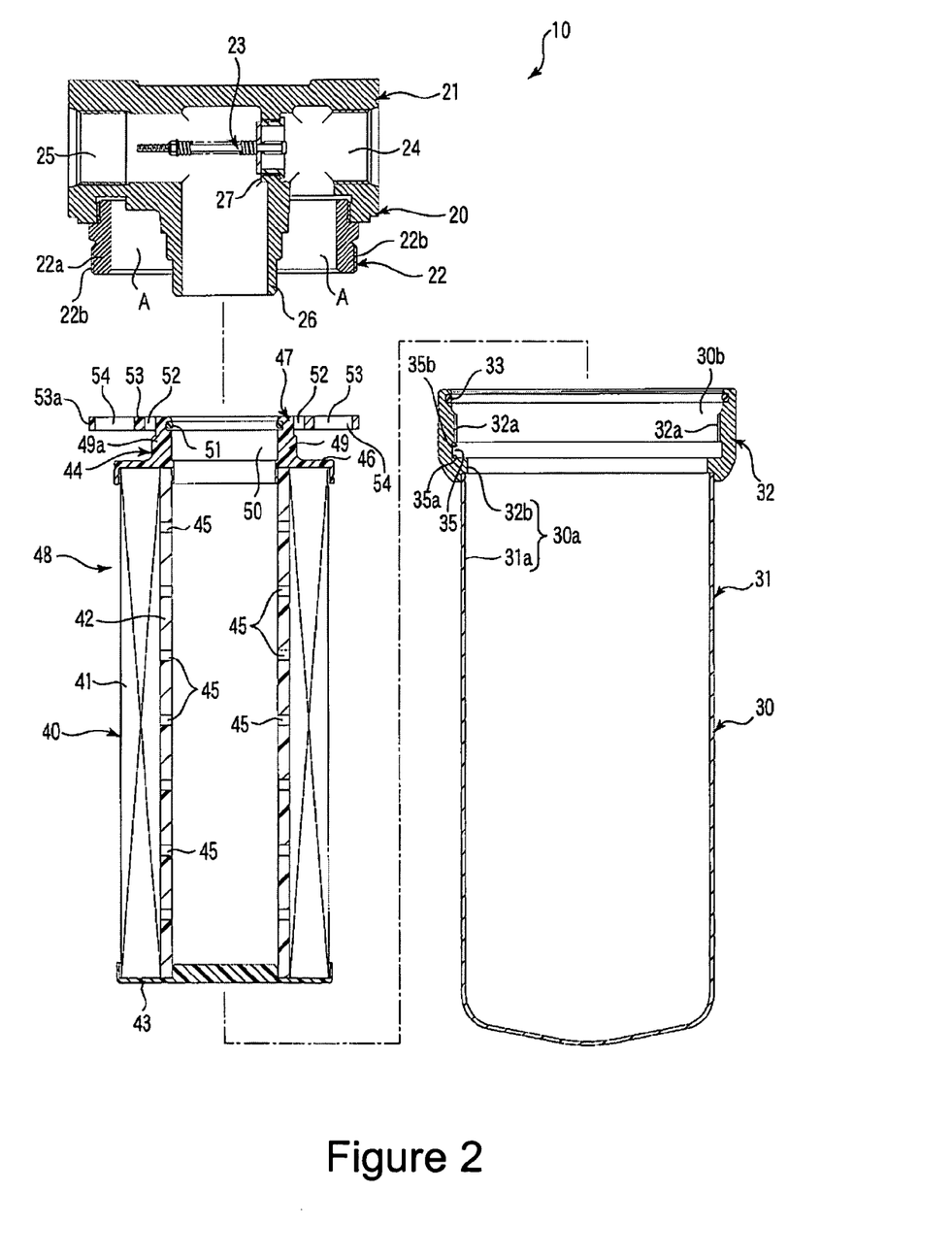
FIG. 2 is a sectional view in which the filter device of FIG. 1 has been disassembled.

FIG. 2 is a sectional view in which the filter device 10 has been disassembled. As shown in FIG. 2, the filter device 10 is provided with a head 20, a housing 30, and a filter element 40.

The head 20 is provided with a first member 21, a second member 22, a relief valve 23, and the like.

The first member 21 has an inlet 24 and an outlet 25. As shown in FIG. 1, the inlet 24 is connected to an outflow part 5a of the hydraulic circuit 5. The inlet 24 is bent in approximately the shape of the letter L. Please note that the inlet 24 bends toward the filter element 40 which is coupled to the head 20 as described below.

As shown in FIG. 2, the first member 21 has a protruding part 26 formed at approximately the center thereof. The protruding part 26 protrudes in the direction of the filter element 40 which is coupled to the head 20 as described below. A portion of the outlet 25 is formed within the protruding part 26. One end of the outlet 25 opens to the end of the protruding part 26. As shown in FIG. 1, the other end of the outlet 25 is connected to an inflow part 5b of the hydraulic circuit 5.

As shown in FIG. 2, the inlet 24 and the outlet 25 are adjacent to each other, being mutually separated by a wall part 27. A relief valve 23 is provided at the wall part 27 that separates the inlet 24 from the outlet 25. When the relief valve 23 is opened, the inlet 24 and the outlet 25 communicate with each other. When the pressure of the operating oil L1 flowing into the inlet 24 exceeds a predetermined value, the relief valve 23 then opens.

The second member 22 is, for example, approximately cylindrical in shape. The second member 22 is coupled to the first member 21 so as to surround the protruding part 26. The first member 21 and the second member 22 are, for example, screwed together. A space A set between the protruding part 26 and a surrounding wall 22a of the second member 22 communicates with the inlet 24.

The housing 30 is provided with a first member 31 and a second member 32. The first member 31 is a cylinder with one end closed.

The second member 32 is a cylindrically-shaped member. The inner periphery of the second member 32 is slightly larger than the inner periphery of the first member 31. One end of the second member 32 is affixed to the open end of the first member 31, such as by welding so that the internal space of the second member 32 communicates with the internal space of the first member 31. The second member 22 of the head 20 is large enough to approximately engage with the second member 32 of the housing 30.

A female screw part 32a is formed on the inner periphery of the second member 32 of the housing 30. A male screw part 22b is formed on the outer periphery of the second member 22 of the head 20. As shown in FIG. 1, the housing 30 is affixed to the head 20 and can be attached and removed by engaging the male screw part 22b of the head 20 with the female screw part 32a of the housing 30. An O-ring 33 is provided between the second member 22 of the head 20 and the second member 32 of the housing 30. The O-ring 33 forms a fluid-tight seal between the second member 22 of the head 20 and the second member 32 of the housing 30.

The protruding part 26 of the first member 21 of the head 20 protrudes into the housing 30, due to the fact that the housing 30 and the head 20 are coupled to each other, as described above. The protruding part 26 is disposed approximately concentrically with the housing 30.

The filter element 40 is inserted into the housing 30 through an opening 30b (opening of the second member 32) of the housing 30. As shown in FIG. 2, the filter element 40 is provided with a filter material 41, an inner cylinder 42, a first supporting member 43, and a second supporting member 44.

The filter material 41 is made from a resin, and is rounded in a pleated configuration, for example. Accordingly, the filter material 41 is approximately cylindrical in shape. The inner cylinder 42 is cylindrical in shape. The height of the inner cylinder 42 is identical to the height of the filter material 41. On the surrounding wall of the inner cylinder 42 is formed a plurality of holes 45 which radially pass through said surrounding wall.

The inner cylinder 42 is contained on the inner side of the filter material 41. The inner cylinder 42 is disposed approximately concentrically with the filter material 41. When the filter material 41 is impelled toward the inner side, the filter material 41 is supported due to the fact that the inner cylinder 42 makes contact with the filter material 41, thereby inhibiting the filter material 41 from changing shape in the direction of the inner side.

The first supporting member 43 supports the lower end of the filter material 41 and the lower end of the inner cylinder 42. The first supporting member 43 is made from a resin.

The second supporting member 44 has a supporting part 46 and an element pressing part 47. The element pressing part 47 is an example of an element pressing body referred to in the present invention.

The supporting part 46 supports the upper end of the filter material 41 and the upper end of the inner cylinder 42. In this embodiment, the filter material 41, the inner cylinder 42, the first supporting member 43, and the supporting part 46 form an element main body 48 referred to in the present invention. The element main body referred to in the present invention is a concept involving the filter element, and excludes the element pressing body.

The element pressing part 47 has a main body 49, a spring part 52, and a contact part 53. The element pressing part 47 is formed integrally with the supporting part 46. For example, the element pressing part 47 is formed integrally with the supporting part 46. The second supporting member 44 is made from a resin.

The main body 49 is in the shape of a cylinder. The main body 49 is formed integrally with the supporting part 46. The main body 49 is disposed concentrically with the supporting part 46. The main body 49 is placed on the upper side of the supporting part 46. In the main body 49 and the supporting part 46 is formed a hole 50 with which the protruding part 26 of the head 20 engages. An O-ring 51 is provided between the edge of the hole 50 and the outer periphery of the protruding part 26. The O-ring 51 forms a fluid-proof seal between the inner periphery of the hole 50 and the outer periphery of the protruding part 26.

The hole 50 communicates with the inside of the inner cylinder 42. Accordingly, the inside of the inner cylinder 42 and the outlet 25 communicate with each other.

Figure 3:
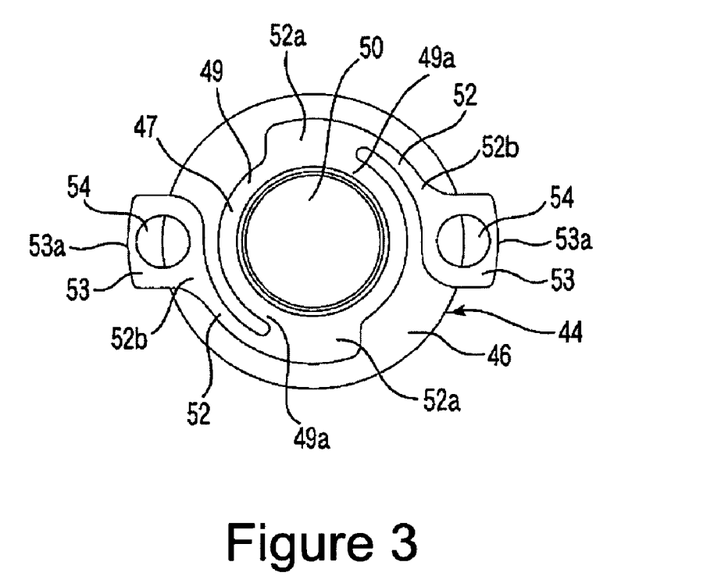
FIG. 3 is a plan view from above the second supporting member of FIG. 1.

FIG. 3 is a plan view from above the second supporting member 44. As shown in FIG. 3, the spring part 52 is formed integrally with the outer periphery 49a of the main body 49. In detail, the spring parts 52 are disposed in a position facing each other with the main body 49 disposed between them.

One end 52a of the spring part 52 is connected to the main body 49. The spring parts 52 extend along the periphery of the main body 49, while maintaining a predetermined distance from the outer periphery 49a of the main body 49. Thus, the spring parts 52 are able to flex in the radial direction of the filter element 40 so as to shorten the distance defined from the outer periphery 49a of the main body 49.

Figure 4:
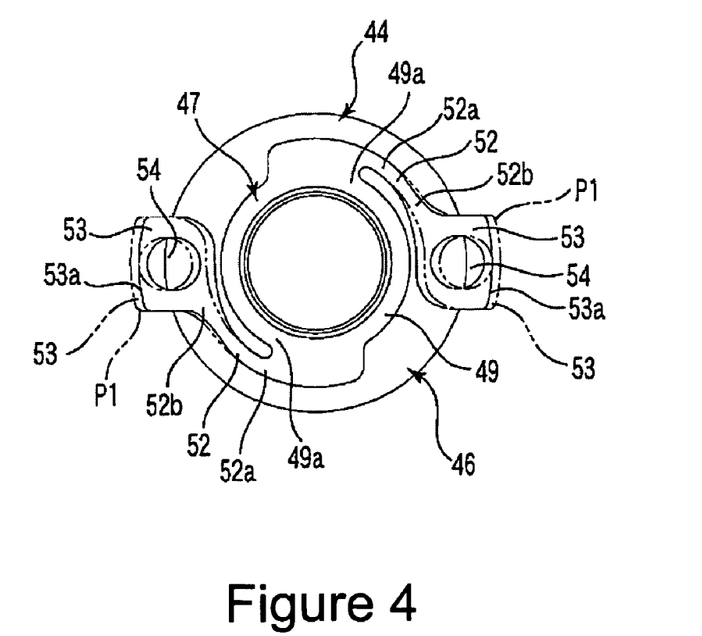
FIG. 4 Plan view from above the second supporting member, showing the conditions before and after the spring parts are flexed shown in FIG. 1.

The contact part 53 is formed integrally with the other end 52b of the spring parts 52. The contact parts 53 are disposed so as to face each other with the main body 49 and the spring parts 52 disposed between them. FIG. 4 is a plan view from above the second supporting member 44, showing the conditions before and after the spring parts 52 flex.

As shown in FIG. 4, the contact parts 53 are able to change position from an initial position P1 indicated by the double-dashed lines in the radial direction toward the inner side, as indicated by the solid lines by the spring part bending.

The initial position P1 is the position of the contact part 53 where the contact part 53 is in a state in which the spring part 52 does not flex. A hole 54 is formed in the contact part 53 that passes through the contact part 53. The hole 54 is an example of a holding part referred to in the present invention.

When the filter element 40 is inserted into the housing 30, the contact parts 53 are able to move toward or away from the inner surface 30a (formed by the inner surface 31a of the first member 31 and the inner surface 32b of the second member 32) of the housing 30, by flexing or releasing the spring part 52.

As shown in FIG. 2, a groove 35 is formed in the second member 32 of the housing 30, facing downward from the female screw part 32a. The groove 35 is concave in the direction that the contact part 53 moves, and in this embodiment, it is concave in the radial direction toward the outer side of the filter element 40.

Figure 5:
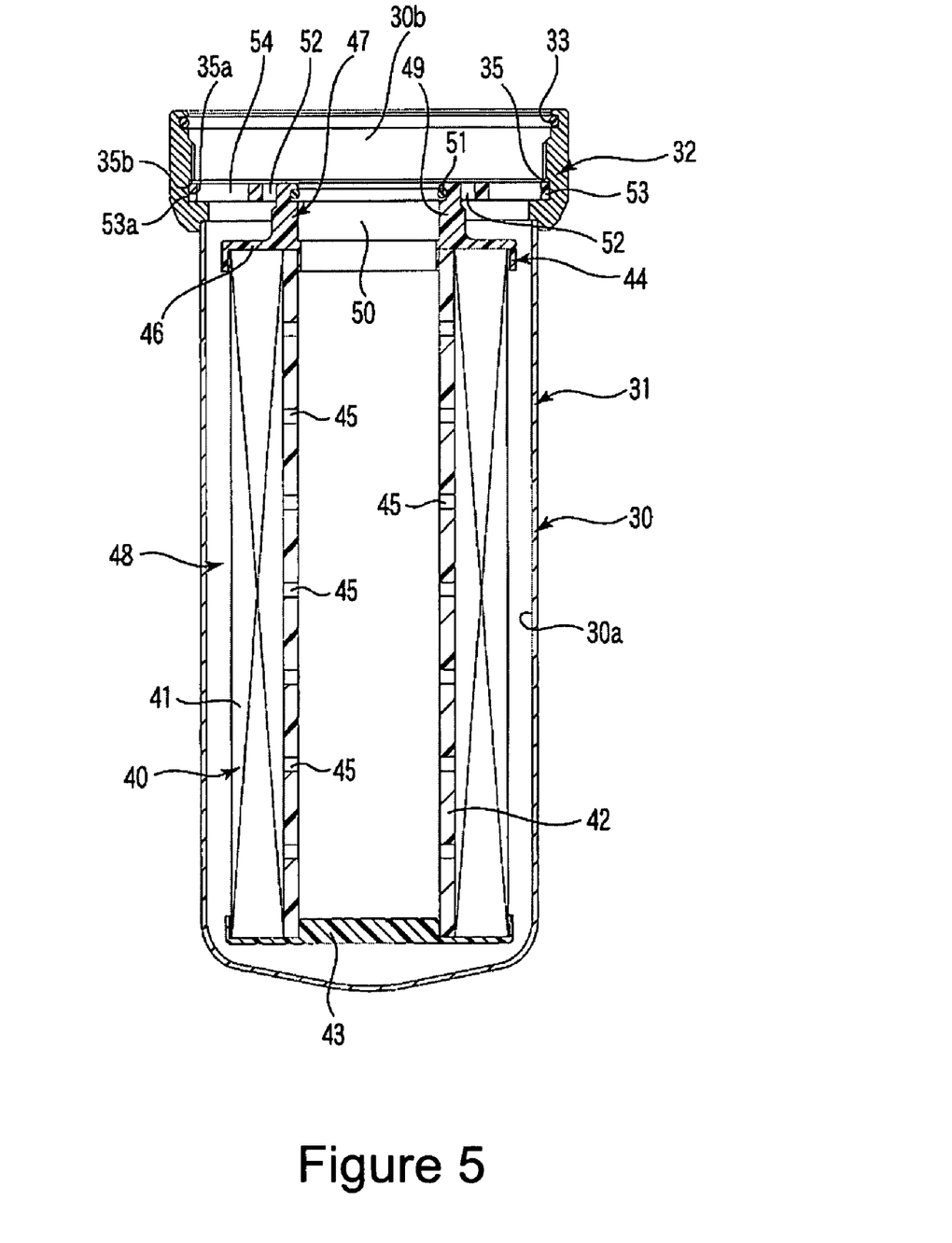
FIG. 5 is a sectional view illustrating a state in which the filter element is inserted into the housing shown in FIG. 1.

FIG. 5 is a sectional view illustrating the state in which the filter element 40 is inserted into the housing 30. As shown in FIG. 5, the size of the contact part 53 or the length of the spring part 52 along the radial direction of the filament element 40 is adjusted so that a portion of the contact part 53 approximately engages with the groove 35 when the filter element 40 is inserted into the housing 30.

Moreover, in this embodiment, the size of the contact part 53 or the length of the spring part 52 along the radial direction of the filter element 40 is adjusted so that the front end 53a of the contact part 53 touches the side end surface 35a (side end surface in the outer side in the radial direction) of the groove 35.

That is to say, when a portion of the contact part 53 is inserted into the groove 35, the spring part 52 is slightly flexed. Accordingly, when a portion of the contact part 53 is inserted into the groove 35, the front end 53a of the contact part 53 makes contact with the side end surface 35a of the groove 35, thereby preventing the filter element 40 from slipping in the radial direction when the filter element 40 is inserted into the housing 30.

Figure 6:
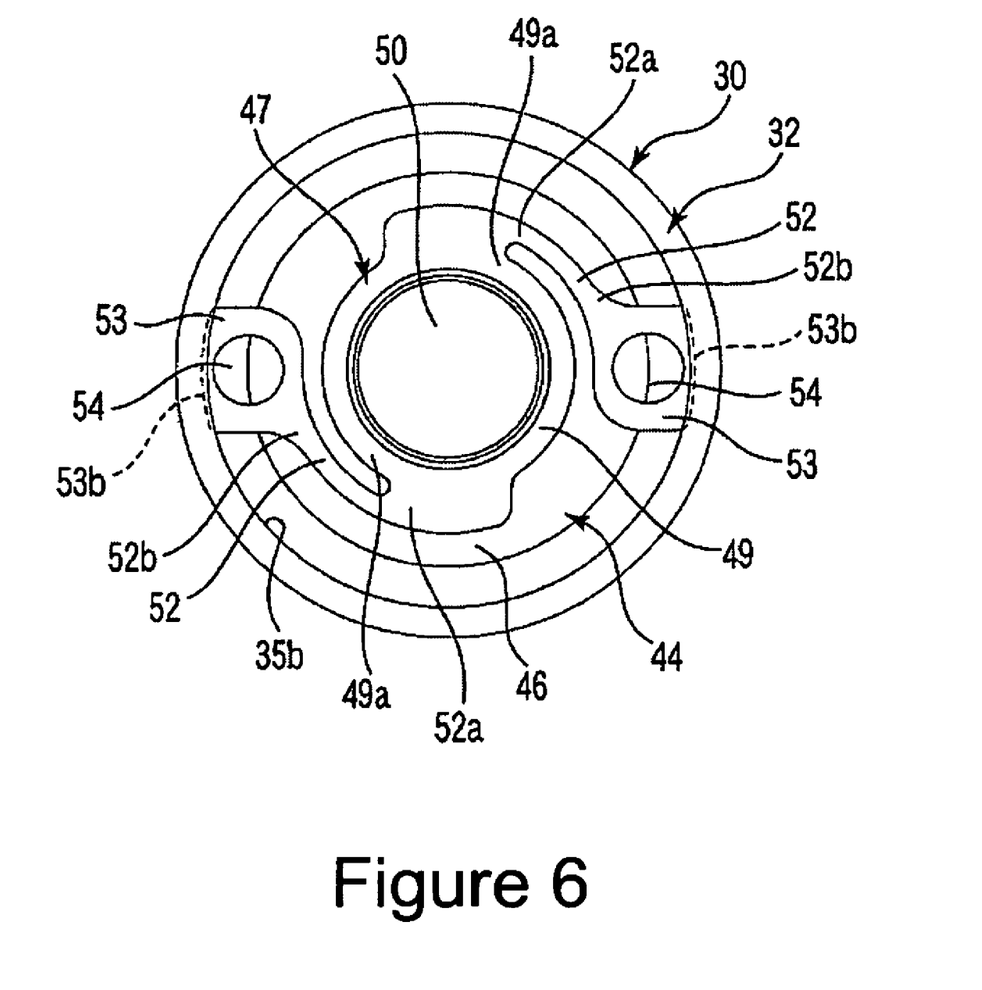
FIG. 6 is an elevated plan view showing a state in which the filter element is inserted into the housing shown in FIG. 1.

FIG. 6 is an elevated plan view, showing a state in which the filter element 40 is inserted into the housing 30. When the filter element 40 shifts in the direction to come out from the housing 30, due to the fact that a portion of the contact parts 53 approximately engage with the groove 35, a portion 53b of the contact part 53 makes contact with the top end surface of the groove 35 as shown by the dotted line in the figure. Accordingly, the filter element 40 is inhibited from coming out of the housing 30.

Figure 7:
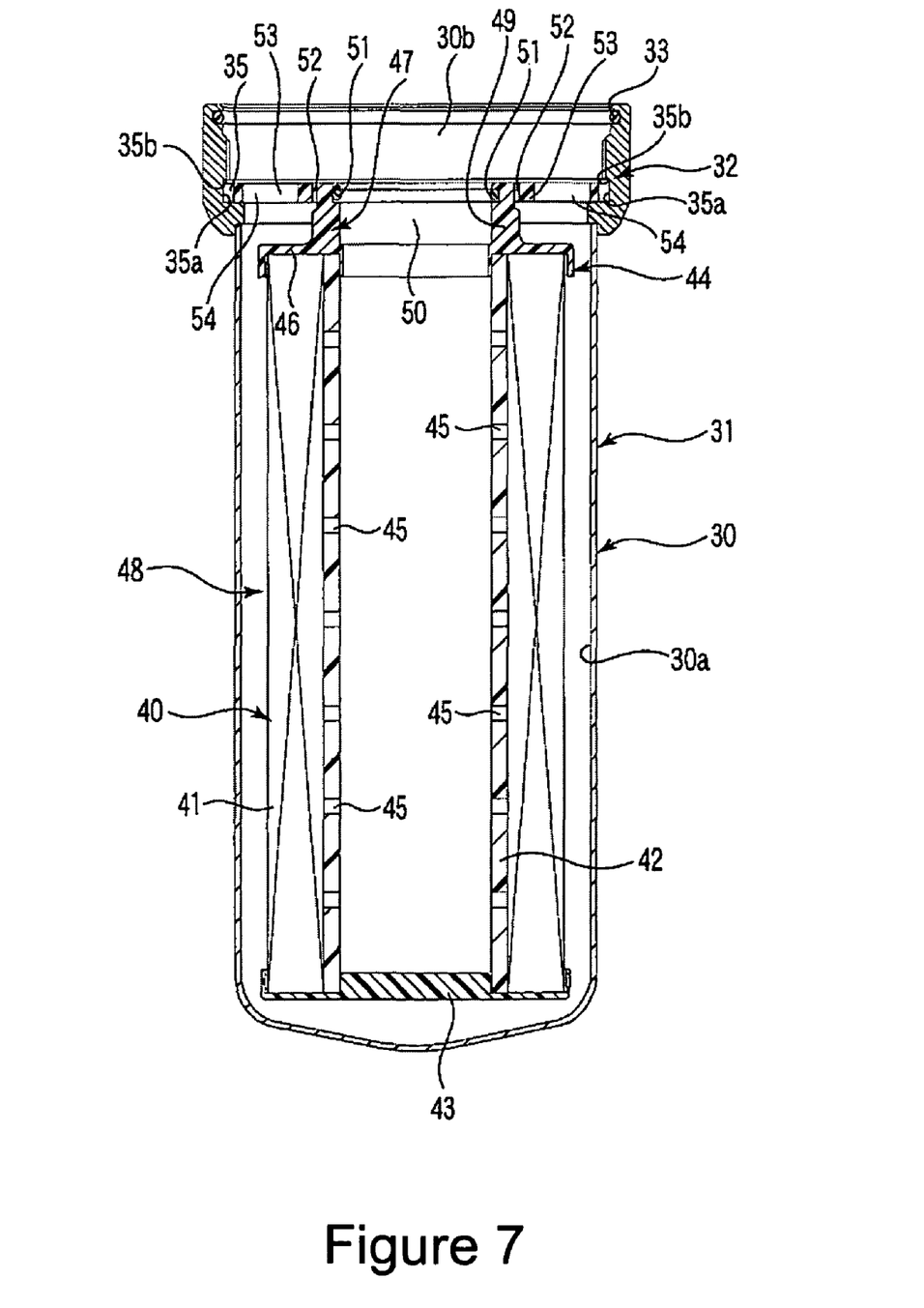
FIG. 7 is a sectional view showing a state in which a contact part has come out of a groove shown in FIG. 1.

FIG. 7 is a sectional view showing a state in which the contact part 53 has come out of the groove 35. As shown in FIG. 7, when the filter element 40 is inserted into the housing 30, or when the filter element 40 is removed from the housing 30, the contact part 53 moves such that it does not interfere with the upper end surface 35b of the groove 35, by flexing the spring parts 52 radially toward the inner side of the filter element 40. Accordingly, the spring part 52 is adjusted so that the contact part 53 can shift to a position where it does not interfere with the upper end surface 35b of the groove 35. For example, the space specified between the spring part 52 and the main body 49 is adjusted.

As shown in FIG. 1, where a filter device 10 is constructed as described above, the operating oil L1 that is to be filtered flows from the outflow part 5a of the hydraulic circuit 5 into the inlet 24 of the head 20. The operating oil L1 passes through the space A specified between the inlet 24 and the protruding part 26 and the second member 22, reaching between the filter material 41 and the inner surface 30a of the housing 30.

The operating oil L1 that reached the outer side of the filter material 41, passing through the filter material 41 in the direction shown by the arrow, is filtered. The operating oil L2 that has been filtered through the filter material 41 passes through the holes 45 of the inner cylinder 42 and exits to the inner side of the inner cylinder 42.

Then, the filtered operating oil L2 passes through the outlet 25 and flows into the inflow part 5b of the hydraulic circuit 5, and then returns into the hydraulic circuit 5.

Next is explained an example of the operation of replacing the filter element 40.

First, the housing 30 is removed from the head 20. Then, as shown in FIG. 4, the filter element 40 is held by the fingers passing into the hole 54 formed in the contact part 53. The spring parts 52 naturally flex radially toward the inner side, by holding the contact part 53 (with the fingers passing into the hole 54). The contact parts 53 shift radially toward the inner side, due to the flexing of the spring parts 52.

Figure 8:
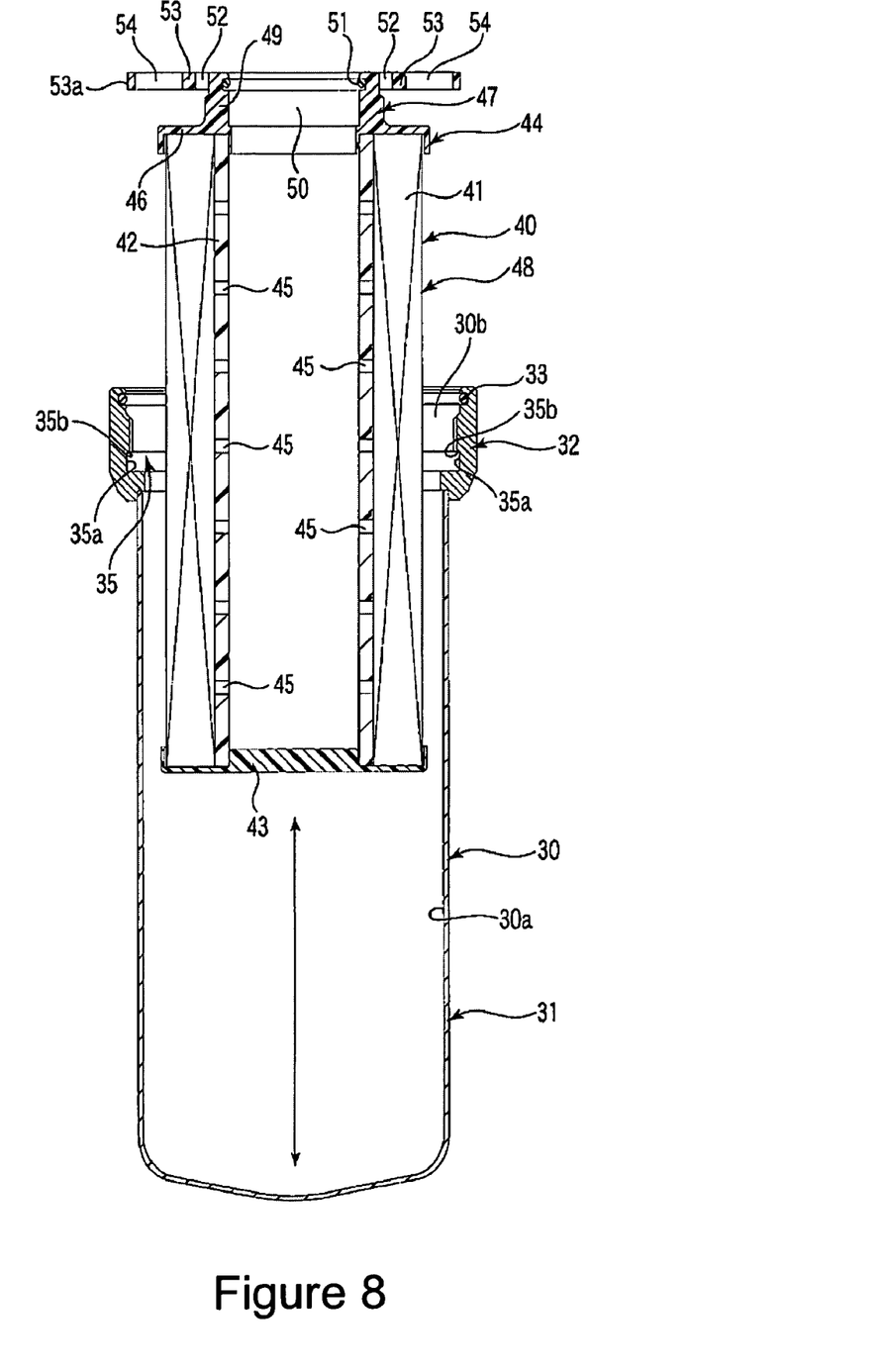
FIG. 8 is a sectional view showing a state in which the filter element of FIG. 1 is removed from the housing, or a state in which the filter element is inserted into the housing.

As shown in FIG. 7, when the contact part 53 moves such that the contact part 53 does not interfere with the upper end surface 35b of the groove 35, and, as shown in FIG. 8, the filter element 40 is removed from inside of the housing 30.

The filter element 40 is made from a resin. Accordingly, after-treatment of the filter element 40 is relatively easy after it has been used.

A new filter element 40 is then inserted into the housing 30. At this time as well, the filter element 40 is passed through the fingers into the hole 54 of the contact part 53 to hold it, and the spring parts 52 flex naturally. Accordingly, the filter element is inserted into the housing 30 without doing anything further.

When the filter element 40 is inserted into the housing 30, and the fingers are released from the hole 54, for example, the contact part 53 engages with the groove 35.

Then, the unit made up of the housing 30 and the filter element 40 is attached to the head 20. The filter element 40 is replaced by the operation described above.

In the case of a filter device 10 constructed in this manner, there is no need for a separate pressing element to immobilize the filter element 40 within the housing 30, due to the fact that the element pressing part 47 is formed integrally with the filter element 40.

Accordingly, the element pressing part 47 can be simultaneously inserted into the housing 30 at the same time as the operation to insert the filter element 40 into the housing 30 is performed. That is to say, due to the fact that the filter element 40 and the element pressing part 47 are not inserted separately in the housing 30, the operation of immobilizing the filter element 40 within the housing 30 becomes more efficient.

Likewise, the element pressing part 47 is no longer separately removed, even in cases where the filter element 40 is removed from the housing 30. Therefore, the efficiency of replacing the filter element 40 is enhanced.

Furthermore, the contact part 53 is able to shift its position due to the elasticity of the spring part 52. Accordingly, when shifting the position of the contact part 53, one only needs to push the contact part 53 radially to the inner side. In other words, since a complex operation is not required to shift the position of the contact part 53, the efficiency of replacing the filter element 40 is enhanced.

Moreover, the contact part 53 is provided as a pair facing each other with the main body 49 disposed between them, in other words, with the spring part 52 disposed between them. In addition, the hole 54 is formed as a holding part on the contact part 53.

Accordingly, when fingers are passed through the hole 54 to hold the filter element 40, the contact parts 53 are naturally pressed radially towards the inner side. As a result, the spring part 52 flexes naturally. In other words, the operation of supporting the filter element 40 and the operation of flexing the spring part 52 are performed together, thereby increasing the efficiency of the operation of replacing the filter element 40.

In addition, by using the groove 35 as an example of a stopping part, the contact part 53 and the upper end surface 35b of the groove 35 touch each other, so the filter element 40 is effectively inhibited from coming out of the housing 30.

Furthermore, since the filter element 40 is made from a resin, it is relatively easy to discard after it is replaced.

Figure 9:
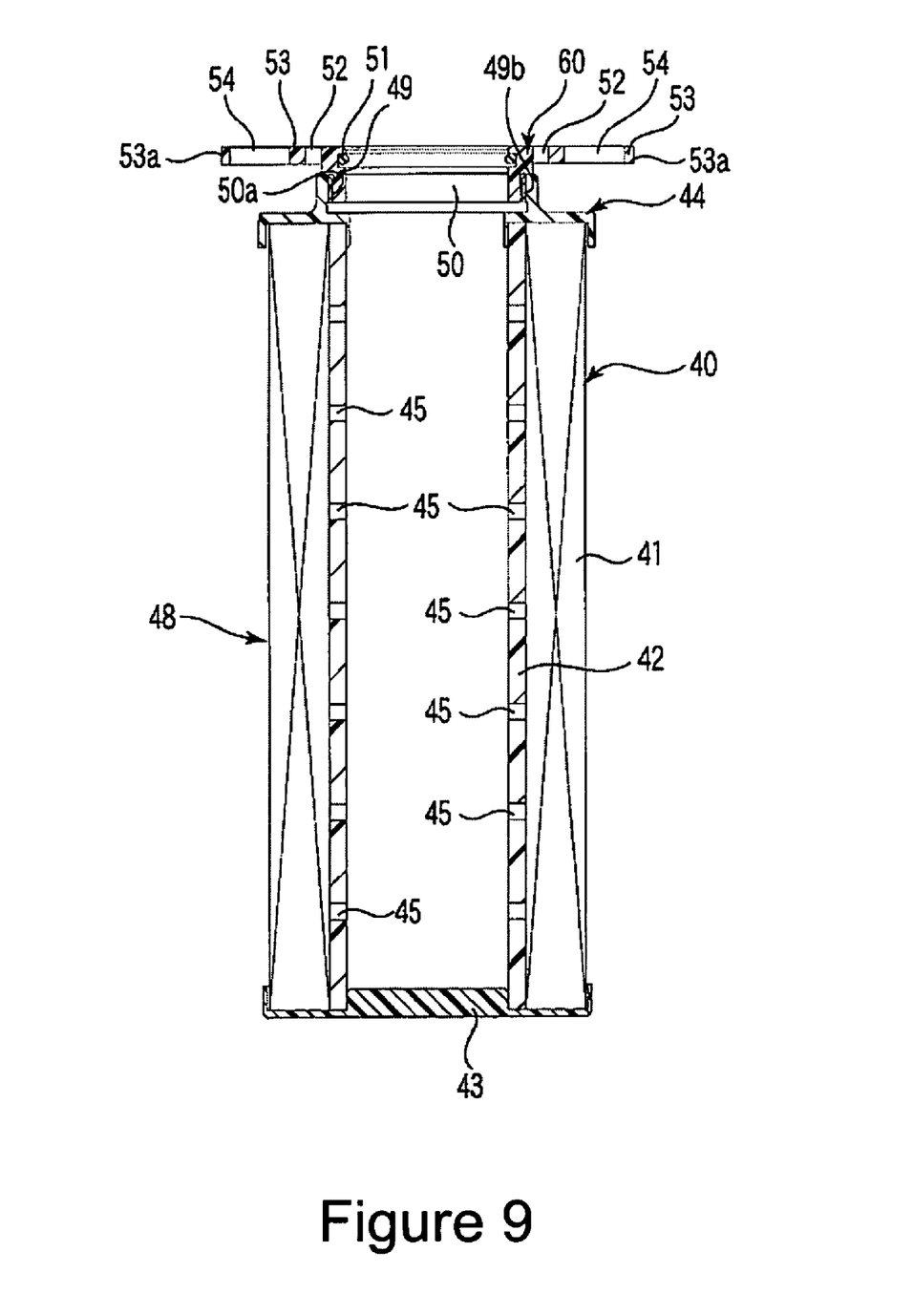
FIG. 9 is a sectional view of a filter element of a filter device according to the second embodiment of the present invention.
Figure 10:
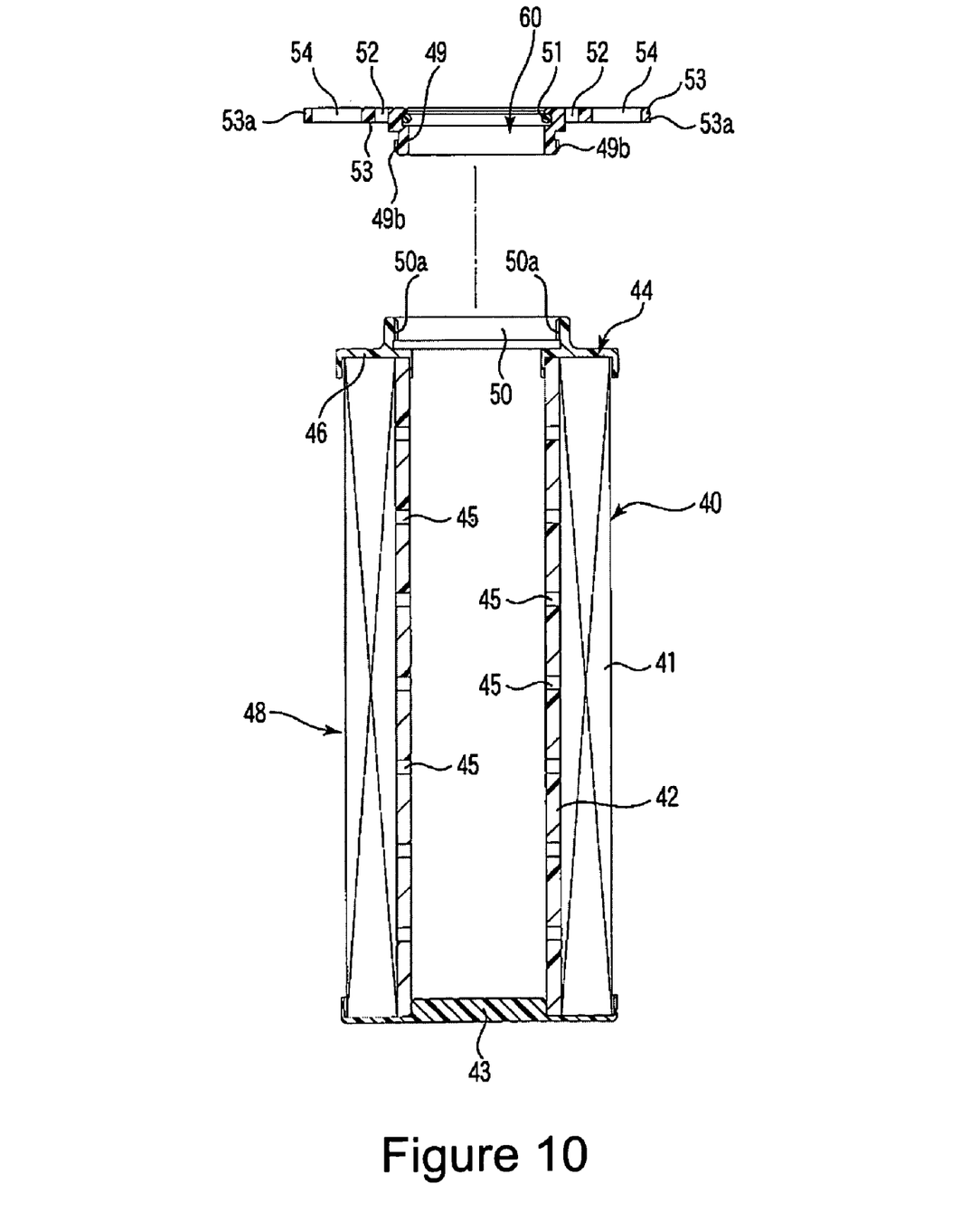
FIG. 10 is a sectional view in which the filter element of FIG. 9 has been disassembled.

Next, a filter device 10 according to the second embodiment of the present invention is described using FIG. 9 and FIG. 10. Structures having the same functions as in the first embodiment are assigned the same reference numerals, and a description thereof is omitted.

In this embodiment, the construction of the filter element 40 differs from that of the first embodiment. Other structures may be identical to the first embodiment. This point will now be described in detail.

FIG. 9 is a sectional view of the filter element 40 of this embodiment. FIG. 10 is a sectional view in which the filter element 40 has been disassembled.

As shown in FIG. 9 and FIG. 10, the filter element 40 is provided with a filter material 41, an inner cylinder 42, a first supporting member 43, a second supporting member 44, and an element pressing member 60.

The second supporting member 44 covers the top end of the filter material 41 and the inner cylinder 42. An hole 50 is formed in the center of the second supporting member 44. The second supporting member 44 of this embodiment does not have an element pressing part.

An element pressing member 60 has a main body 49, a spring part 52, and a contact part 53. The element pressing member 60 is an example of the element pressing body referred to in the present invention. In this embodiment, the filter material 41, the inner cylinder 42, the first supporting member 43, and the second supporting member 44 form the element main body 48.

A female screw part 50a is formed on the inner periphery of the hole 50 of the second supporting member 44. The main body 49 of the element pressing member 60 is large enough to approximately engage with the hole 50. On the outer periphery 49a of the main body 49 is formed a male screw part 49b that screws into the female screw part 50a. In this embodiment, the fact that the male screw part 49b and the female screw part 50a are screwed together makes it possible for the element pressing member 60 to be removably attached to the element main body 48. Accordingly, in addition to the advantageous effects of the first embodiment, it is also possible to re-use the element pressing member 60, by removing the element pressing member 60 from the element main body 48.

Figure 11:
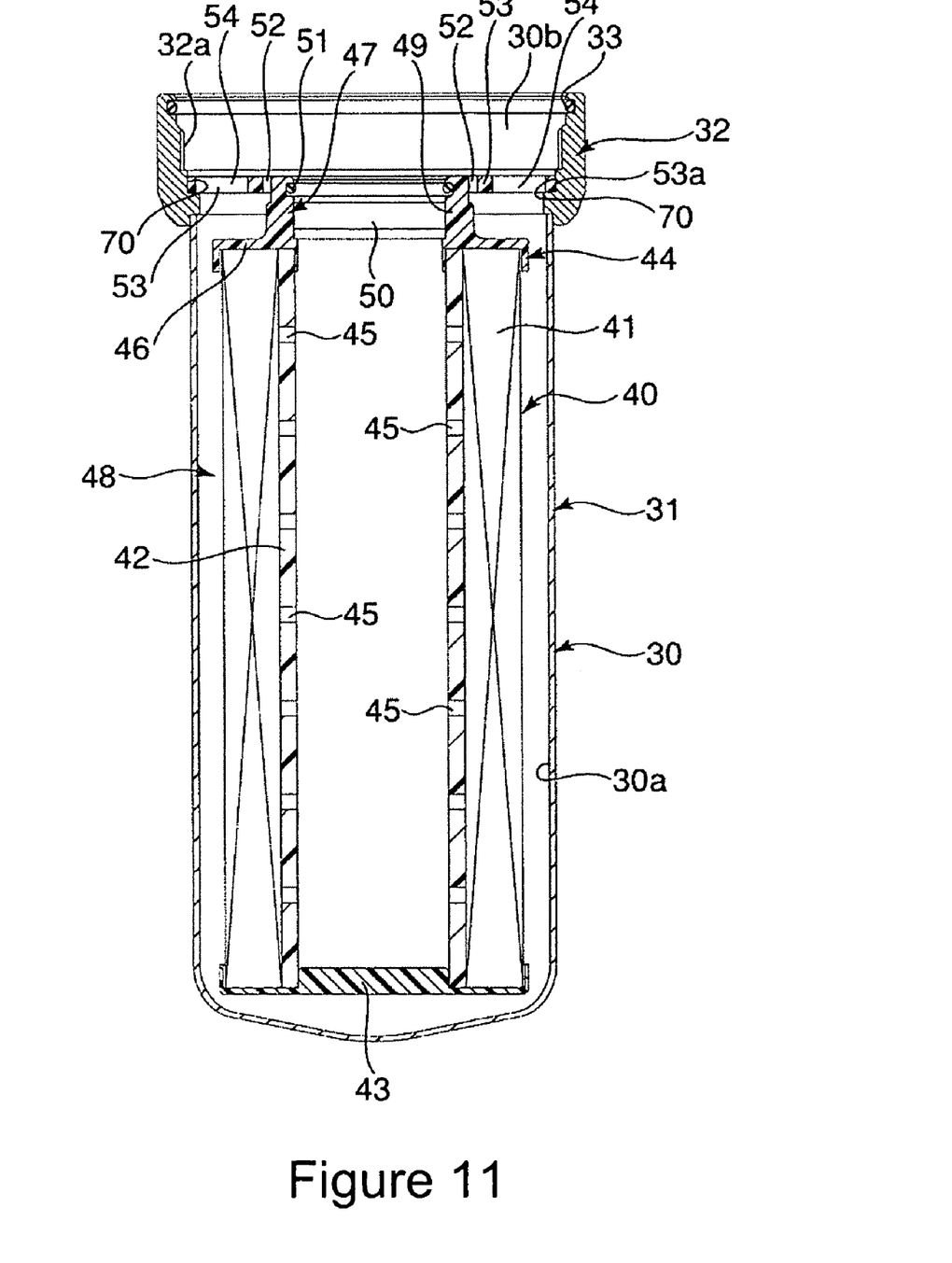
FIG. 11 is a sectional view showing a state in which the filter element is inserted into the housing of a filter device according to the third embodiment of the present invention.

Next, a filter device 10 according to the third embodiment of the present invention is described using FIG. 11. Structures having the same functions as in the first embodiment are assigned the same reference numerals, and a description thereof is omitted.

In this embodiment, the construction of the stopping part and the construction of the element pressing part 47 differ from the first embodiment. Other structures may be identical to the first embodiment. This point will now be described in detail.

FIG. 11 is a sectional view showing a state in which the filter element 40 is inserted into the housing 30. As shown in FIG. 11, the stopping part in this embodiment is not a groove. The stopping part is a surface 70 that makes contact with the front end 53a of the contact part 53. The surface 70 can be formed, for example, with a rough surface to increase the friction that develops between it and the front end 53a of the contact part 53.

In this embodiment, the friction that develops between the surface 70 and the front end 53a of the contact part 53 inhibits the filter element 40 from coming out of the housing 30. Accordingly, the spring part 52 is adjusted so that it is able to fully impel the contact part 53 toward the surface 70.

In this embodiment, there is no need for a great deal of processing to form a stopping part, since the surface 70 serves as a stopping part. Accordingly, in addition to the advantageous effects of the first embodiment, it is also possible to relatively easily form the housing 30.

Moreover, the filter element 40 is inhibited from slipping in the radial direction, since the front end 53a of the contact part 53 makes contact with the surface 70 in the radial direction. Thus, when the unit made up of the housing 30 and the filter element 40 is attached to the head 20, it becomes easy to guide the protruding part 26 to the holes 45.

INDUSTRIAL UTILITY

In accordance with the present invention, the efficiency of the operation of immobilizing the filter element in the housing is enhanced, since the filter element and the element pressing part are not inserted into the housing separately. Likewise, the element pressing part is no longer removed separately, even in cases where the filter element is removed from within the housing. Thus, it is possible to efficiently replace the filter element.

The invention claimed is:

1. A filter device comprising:
   a head in which fluid flows
   a filter element that filters the fluid;
   a housing that encloses the filter element, the housing having an opening at a first end through which the filter element is inserted into and removed from the housing, the housing further having an annular groove formed around an inner periphery of the housing at the first end; and
   an element pressing part disposed at an end of the filter element for releasably holding the filter element inside the housing,
   the element pressing part comprising an annular main body secured to the end of the filter element and at least two spring parts disposed at angular intervals in a single plane that is transverse to an axis of the housing, each spring part having an arcuate arm that extends in the single plane spirally outwardly from the main body and a contact part that is provided at a free end of the arcuate arm, each contact part having an engagement part engageable with a human finger, the element pressing part being made of an elastic material such that the arcuate arms are readily bendable in the single plane towards the main body by finger force applied to the engagement parts to thereby move the contact parts radially inwardly,
   wherein, when the filter element is placed in the housing, the contact parts of the element pressing part are trapped in the annular groove of the housing and the element pressing part holds the filter element inside the housing with engagement between the contact parts and the groove, whereas when removing the filter element from the housing, finger force is applied to the engagement parts of the element pressing part to bend the arcuate arms towards the main body and move the contact each contact parts radially inwardly out of the groove to free the element pressing part from the groove.

2. A filter device of claim 1 wherein the engagement parts are holes formed in the contact parts, the holes being of a size large enough for human fingers to go through.

3. A filter device of claim 1, wherein the element pressing part is removably attached to the element main body.

4. A filter device of claim 1, wherein the filter element is made from a resin.

5. A method of attaching and detaching a filter element to a filter housing, the method comprising:
   providing a filter element comprising an element pressing part disposed at an end of the filter element, the element pressing part comprising an annular main body secured to the end of the filter element and at least two spring parts disposed at angular intervals in a single plane that is transverse to an axis of the filter element, each spring part having an arcuate arm that extends in the single plane spirally outwardly from the main body and a contact part that is provided at a free end of the arcuate arm, each contact part having an engagement part engageable with a human finger, the element pressing part being made of an elastic material such that the arcuate arms are readily bendable in the single plane towards the main body by finger force applied to the engagement parts to thereby move the contact parts radially inwardly;
   engaging a finger with each of the engagement parts;
   applying a finger pressure to each of the engagement part against biasing force of the spring parts, thereby causing the spring parts to flex through the single transverse plane towards the main body of the element pressing part and to move the contact parts radially inwardly;
   inserting the filter element into a housing having an annular groove formed in an inner periphery of housing;
   releasing the finger pressure from the engagement parts of the element pressing part to thereby allow the contact parts to move radially outwardly in the groove of the housing such that the filter element is secured to the housing;

applying a finger pressure to the engagement parts, thereby moving the contact parts radially inwardly out of the annular groove, thereby releasing the filter element from the housing; and withdrawing the filter element from the housing.

6. A filter device comprising:

a head in which fluid flows;

a filter element that filters the fluid;

a housing that encloses the filter element, the housing having an opening at a first end through which the filter element inserted into and removed from the housing, the housing further having an inner surface with a high-friction portion disposed at a periphery of the housing proximate the first end; and an element pressing part disposed at an end of the filter element for releasably holding the filter element inside the housing, the element pressing part comprising an annular main body secured to the end of the filter element and at least two spring parts disposed at angular intervals in a single plane that is transverse to an axis of the housing, each spring part having an arcuate arm that extends in the single plane spirally outwardly from the main body and a contact part that is provided at a free end of the arcuate arm, each contact part having an engagement part engageable with a human finger, the element pressing part being made of an elastic material such that the arcuate arms are readily bendable in the single plane towards the main body by finger force applied to the engagement parts to thereby move the contact parts radially inwardly, wherein, when the filter element is placed in the housing, the contact parts of the element pressing part frictionally engage with the high-friction portion of the housing due to radially outward pressure exerted by the spring parts, whereby the frictional engagement between the contact parts and the high-friction portion holds the filter element inside the housing, whereas when removing the filter element from the housing, finger force is applied to the engagement parts of the element pressing part to bend the arcuate arms towards the main body and move the contact parts radially inwardly away from the high-friction portion to free the element pressing part from the high-friction portion of the housing.

* * * * *